(12) United States Patent
Burns

(10) Patent No.: US 11,323,701 B2
(45) Date of Patent: May 3, 2022

(54) SYSTEMS AND METHODS FOR GROUP OF PICTURES ENCODING

(71) Applicant: Panopto, Inc., Seattle, WA (US)

(72) Inventor: Eric Burns, Seattle, WA (US)

(73) Assignee: Panopto, Inc., Seattle, WA (US)

( * ) Notice: Subject to any disclaimer, the term of this patent is extended or adjusted under 35 U.S.C. 154(b) by 15 days.

(21) Appl. No.: 16/578,237

(22) Filed: Sep. 20, 2019

(65) Prior Publication Data

US 2020/0260075 A1 Aug. 13, 2020

Related U.S. Application Data

(63) Continuation of application No. 15/915,328, filed on Mar. 8, 2018, now abandoned, which is a continuation of application No. 14/634,964, filed on Mar. 2, 2015, now abandoned.

(60) Provisional application No. 61/955,946, filed on Mar. 20, 2014.

(51) Int. Cl.
*H04N 19/114* (2014.01)
*H04N 19/177* (2014.01)
*H04N 19/136* (2014.01)
*H04N 19/40* (2014.01)

(52) U.S. Cl.
CPC ......... *H04N 19/114* (2014.11); *H04N 19/136* (2014.11); *H04N 19/177* (2014.11); *H04N 19/40* (2014.11)

(58) Field of Classification Search
CPC .. H04N 19/114; H04N 19/136; H04N 19/177; H04N 19/40
USPC ........................................................ 348/474
See application file for complete search history.

(56) References Cited

U.S. PATENT DOCUMENTS

| | | | | |
|---|---|---|---|---|
| 5,818,542 A | * | 10/1998 | Harnois | H04N 5/262 348/594 |
| 6,748,020 B1 | | 6/2004 | Eifrig et al. | |
| 8,189,657 B2 | * | 5/2012 | Kapoor | H04N 19/127 375/240.01 |
| 2015/0271492 A1 | | 9/2015 | Burns | |
| 2018/0199033 A1 | | 7/2018 | Burns | |

* cited by examiner

*Primary Examiner* — William C Vaughn, Jr.
*Assistant Examiner* — Naod W Belai
(74) *Attorney, Agent, or Firm* — Perkins Coie LLP

(57) ABSTRACT

Systems and methods are provided encoding a video. Video data is captured. The video data is stored in a group of pictures format, where the group of pictures format comprises a plurality of GOP files, each GOP file including exactly one group of pictures unit. The video data is encoded into a prespecified format. Encoding includes accessing the GOP files containing the video data in the group of pictures format, and encoding the video data into the prespecified format using the GOP files to generate an encoded video.

21 Claims, 6 Drawing Sheets

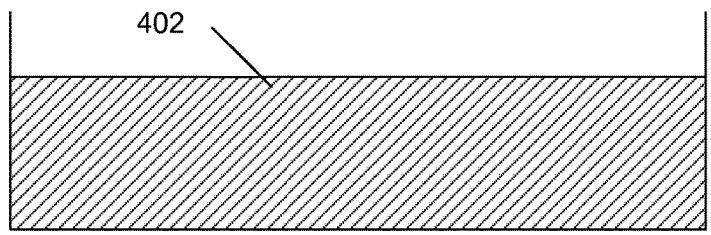
FIRST VIDEO DATA
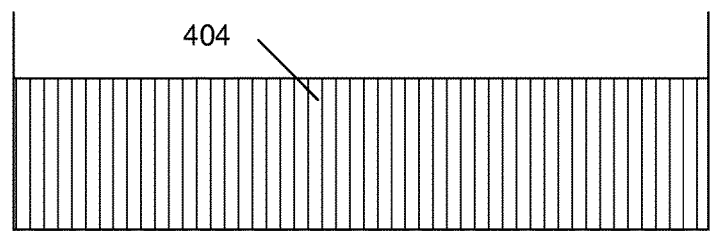
SECOND VIDEO DATA
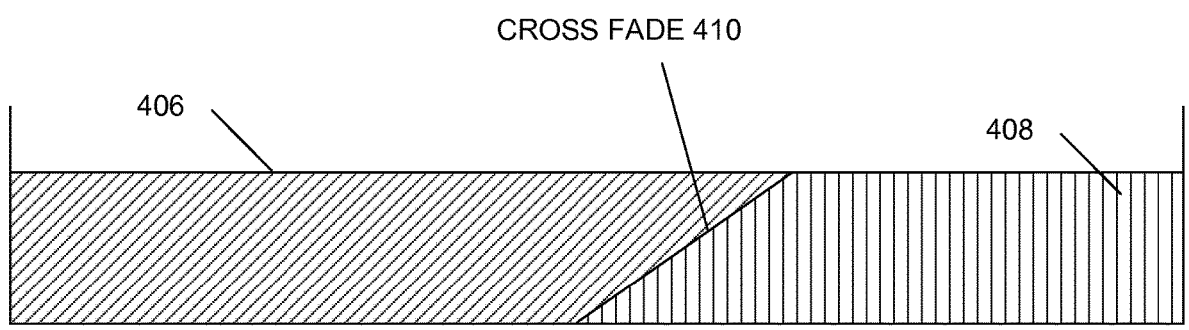
ENCODED VIDEO
FIG. 4

SYSTEMS AND METHODS FOR GROUP OF PICTURES ENCODING

CROSS REFERENCE TO RELATED APPLICATIONS

This application is a continuation of U.S. patent application Ser. No. 15/915,328, filed Mar. 8, 2018, entitled "Systems and Methods for Group of Pictures Encoding," which is a continuation of U.S. patent application Ser. No. 14/634,964, filed Mar. 2, 2015, entitled "Systems and Methods for Group of Pictures Encoding," which claims priority to U.S. Provisional Patent Application No. 61/955,946, filed Mar. 20, 2014, entitled "Systems and Methods for Group of Pictures Encoding," the contents of which are hereby incorporated by reference in their entireties.

FIELD

This disclosure is related generally to digital video and more particularly to digital video encoding.

BACKGROUND

The demand for digital video continues to increase, especially in view of the continually falling costs of bandwidth for delivery of such video. While data processing speeds continue to increase, video encoding is still often a time consuming endeavor. Thus, there is a continuing need to streamline video encoding processes.

SUMMARY

Systems and methods are provided encoding a video. Video data is captured. The video data is stored in a group of pictures format, where the group of pictures format comprises a plurality of GOP files, each GOP file including exactly one group of pictures unit. The video data is encoded into a prespecified format. Encoding includes accessing the GOP files containing the video data in the group of pictures format, and encoding the video data into the prespecified format using the GOP files to generate an encoded video.

As another example, a system for encoding a video includes a computer-readable medium encoded with video data stored in a group of pictures format, wherein the group of pictures format comprises a plurality of GOP files, each GOP file including exactly one group of pictures unit. A data processor is configured to encode the video data in the group of pictures format using the GOP files to generate an encoded video.

BRIEF DESCRIPTION OF THE DRAWINGS

FIG. 4 is a diagram depicting an example combination of two video data portions in an encoded video.

DETAILED DESCRIPTION

Figure 1:
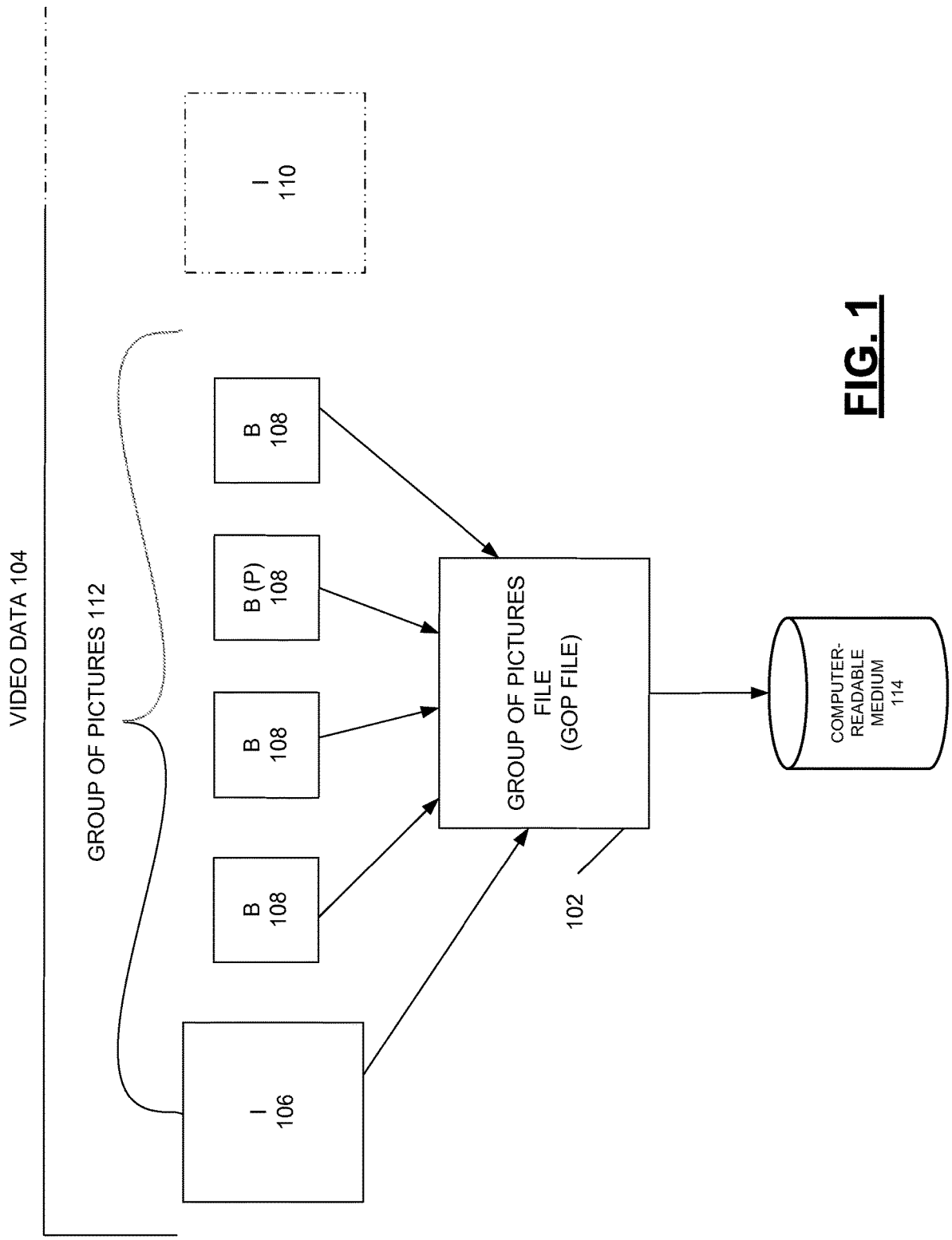
FIG. 1 is a block diagram depicting example contents of a group of pictures (GOP) file.

FIG. 1 is a block diagram depicting example contents of a group of pictures (GOP) file. A GOP file 102 is a file containing data associated with a collection of video frames. A frame is one of many still pictures that when displayed in fast sequence produces a video display. Digital video utilizes a variety of video frame types as a form of compression that can facilitate transmission of digital video utilizing reduced bandwidth. Video frames can include I frames (e.g., intra coded picture frames) that contain a picture that is coded independently of all other frames. Thus, an I frame can be rendered on its own, without referencing data from other frames. Other types of video frames require reference to data from other frames for picture rendering. For example, an intermediate video frame may identify only pixels of a picture that have changed since a previous frame or previous I frame. By not including data associated with unchanged pixels, such an intermediate video frame often requires less data than an I frame (especially in portions of video containing limited pixel changes where displayed objects exhibit little motion). Example intermediate frames include P frames (e.g., predictive coded picture frames) that contain motion compensated difference information relative to one previously decoded picture and B frames (e.g., bipredictive coded picture frames) that contain motion compensated difference information relative to one or more previously decoded pictures. In the example of FIG. 1, captured video data 104 includes a first independently coded I frame 106 followed by a plurality of intermediate frames 108 (e.g., P frames and B frames), further followed by a second independently coded I frame 110.

A group of pictures is an independent unit of video data that includes exactly one independently coded picture frame and one or more intermediate frames that directly or indirectly reference the independently coded picture frame. A GOP file 102 contains exactly one group of pictures unit 112. A group of pictures unit includes one independently coded picture frame (e.g., I frame 106) and one or more intermediate frames 108 that directly or indirectly reference the independently coded frame. The GOP file 102 does not include the second independently coded frame 110. Each group of pictures of the video data 104 is compiled into a GOP file 102, where each GOP file 102 is stored in a computer-readable medium 114.

Figure 2:
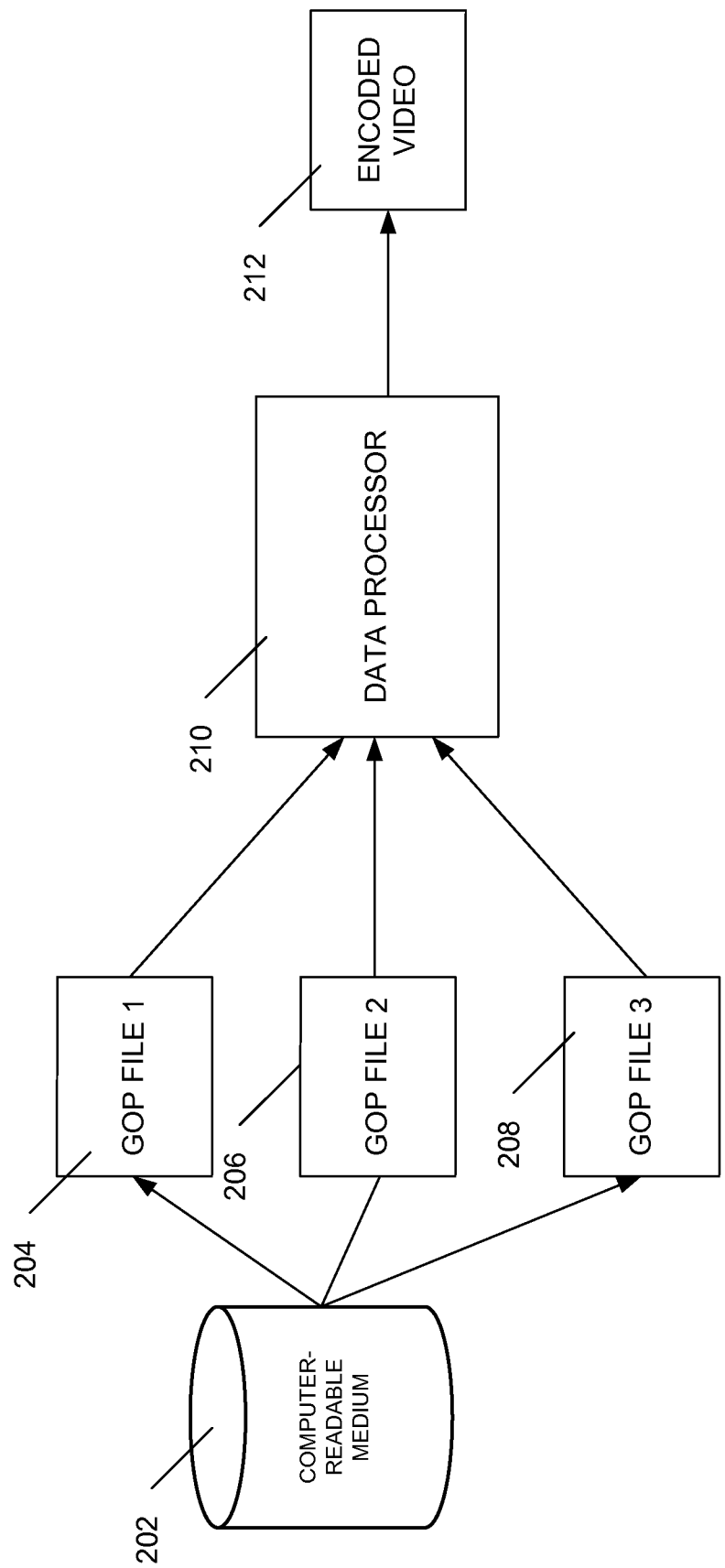
FIG. 2 is a block diagram depicting a system for encoding a stream of video.

A computer-readable medium containing a collection of GOP files (e.g., an unencoded collection of an I frame and referencing P and B frames) can be utilized to generate encoded video in a variety of contexts. FIG. 2 is a block diagram depicting a system for encoding a stream of video. A computer-readable medium 202 is encoded with video data stored in a group of pictures format, where the group of pictures format comprises a plurality of GOP files 204, 206, 208, each GOP file 204, 206, 208 including exactly one group of pictures unit. A data processor 210 is configured to encode the video data in the group of pictures format using the GOP files 204, 206, 208 to generate and encoded video 212. In one example, the data processor 210 is configured to sequentially access the GOP files 204, 206, 208, process each GOP file, and add data to the encoded video 212 based on that GOP file.

Figure 3:
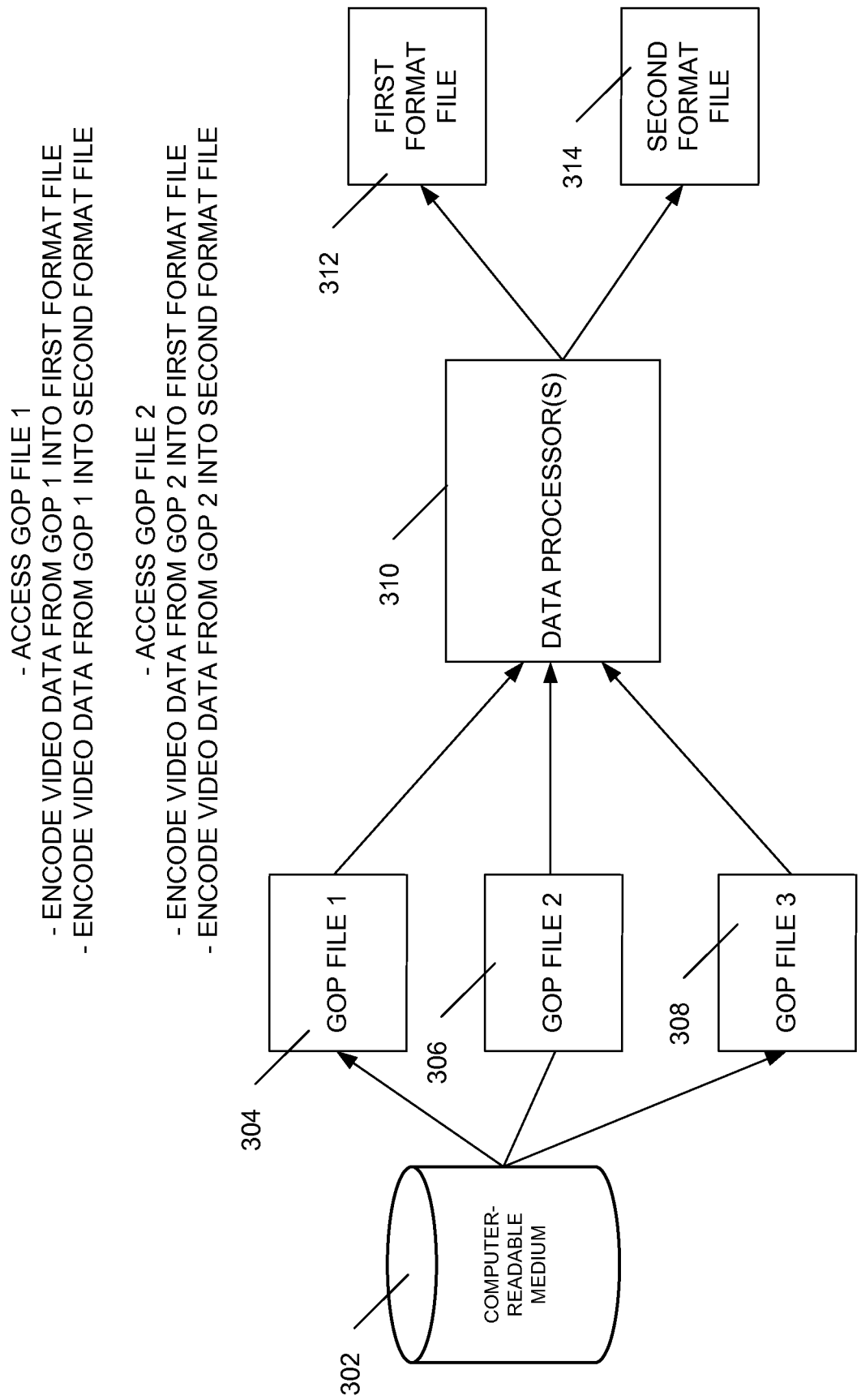
FIG. 3 is a block diagram depicting a system encoding video data in multiple formats at the same time using GOP files.

FIG. 3 is a block diagram depicting a system encoding video data in multiple formats at the same time using GOP files. A computer-readable medium 302 contains a plurality of GOP files 304, 306, 308. A data processor(s) 310 is configured to access a first GOP file 304. The data processor 310 then encodes video data from the first GOP file 304 into a first format as part of a first format file 312. Then, or at the same time, the data processor 310 encodes video data from the first GOP file 304 into a second format as a part of a second format file 314. The data processor then accesses a second GOP file 306. The data processor 310 then encodes video data from the second GOP file 306 into the first format as part of the first format file 312. Then, or at the same time, the data processor 310 encodes video data from the second GOP file 306 into the second format as a part of the second format file 314. The system and process described in FIG. 3 can accelerate encoding of the two files 312, 314 into different formats by limiting the memory accesses to each group of pictures to a single access. If the video files in different formats 312, 314 were encoded wholly in serial, the data processor 310 would need to access each group of pictures from the computer-readable medium 302 twice.

FIG. 4 is a diagram depicting an example combination of two video data portions in an encoded video. First video data 402 and second video data 404 are captured and represented on respective timelines. A system receives instructions to generate an encoded video that includes a first portion 406 that includes the first video data 402 and a second portion 408 that includes the second video data. The instructions further command a transition portion. In the example of FIG. 4, the transition between the first portion 406 and the second portion 408 is a cross fade, where during the transition more of the second video data 404 is displayed on the screen and less of the first video data is included as the transition progresses. Example transitions include cross fades, dissolves, peels, slides, hard transitions, and wipes.

Figure 5:
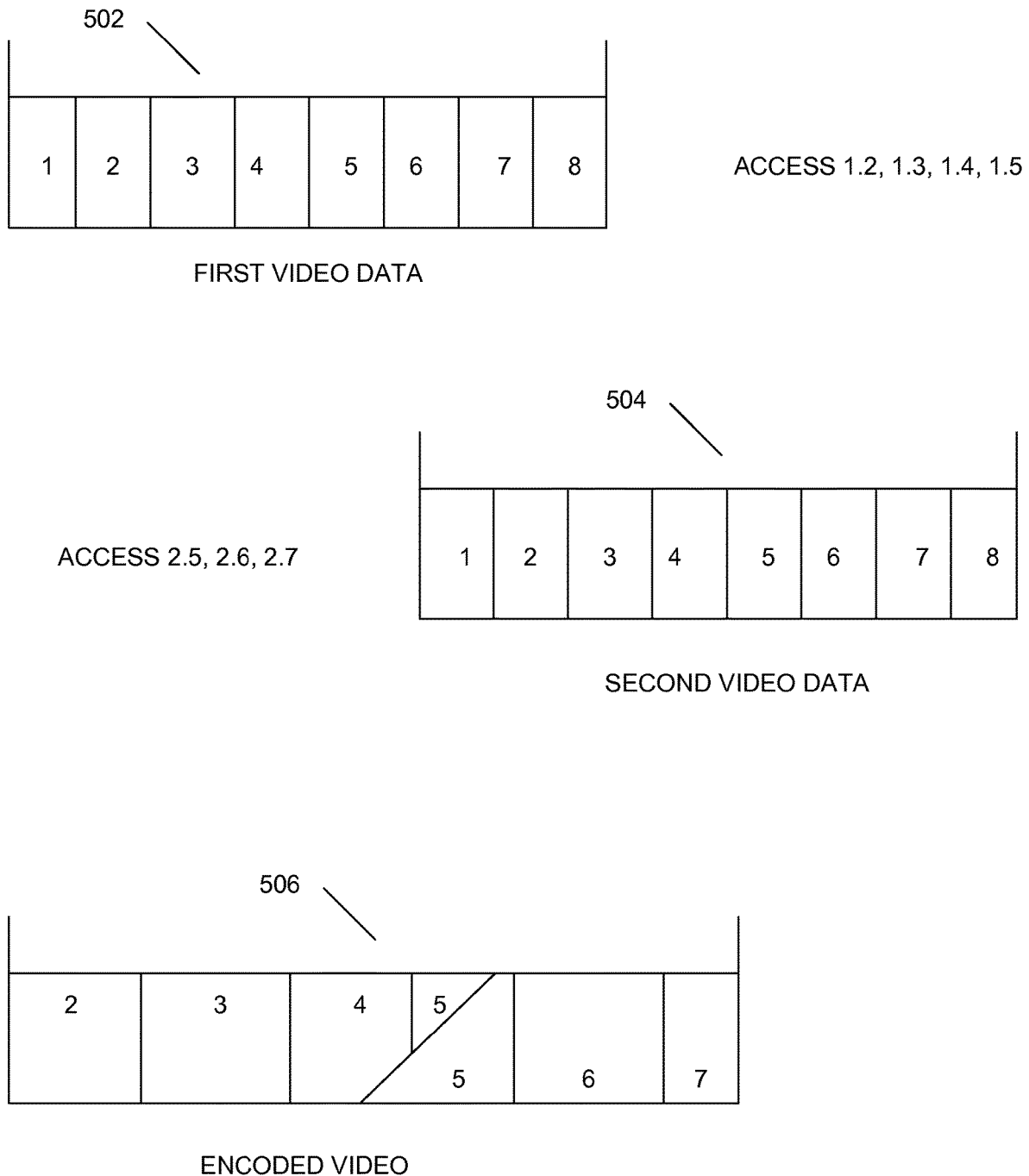
FIG. 5 is a diagram depicting example GOP files involved in generating the encoded video of FIG. 4.

FIG. 5 is a diagram depicting example GOP files involved in generating the encoded video of FIG. 4. First video data 102 includes 8 GOP files, and second video data also includes 8 GOP files. In the commanded encoded video 106, GOP files 1.2, 1.3, 1.4, and 1.5 are present containing first video data, while GOP files 2.5, 2.6, and 2.7 are present containing second video data. In the commanded encoded video, GOP files 1.2, 1.3, 2.6, and 2.7 are displayed in full, while GOP files 1.4, 1.5, and 2.5 are associated a subset of GOP files that are associated with the transition. A data processor is configured to receive the identification of the portion of the first video data (i.e., the portions associated with GOP files 1.2, 1.3, 1.4, and 1.5) and the portion of the second video data (i.e., the portions associated with GOP files 2.5, 2.6, and 2.7) to be included in the encoded video 106 and accesses those GOP files. The processor is further configured to use the accessed GOP files to encode the video 506 in a prespecified format, including the transition, as commanded.

Figure 6:
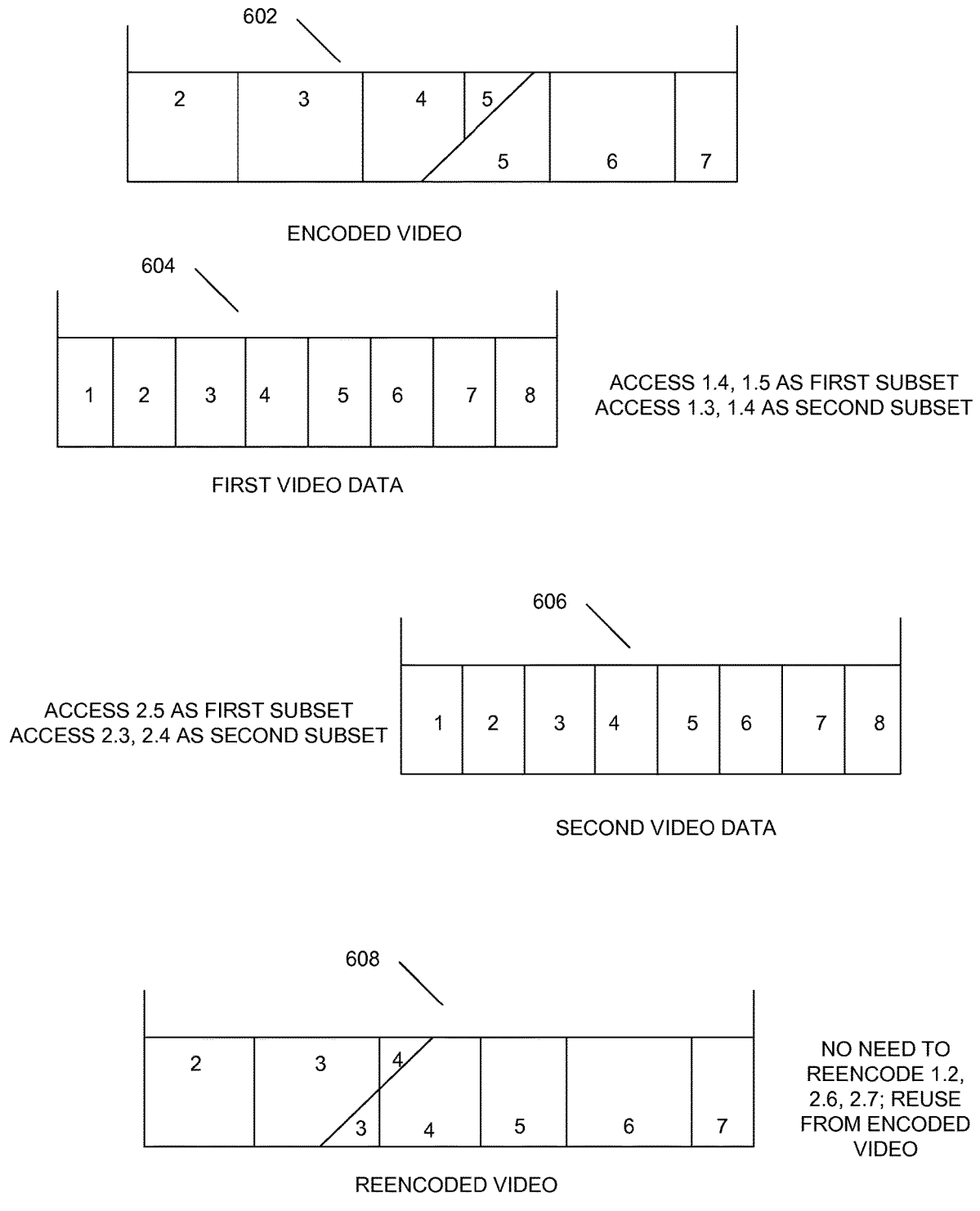
FIG. 6 is a diagram depicting a process for reencoding a video based on a transition adjustment.

FIG. 6 is a diagram depicting a process for reencoding a video based on a transition adjustment. An encoded video 602 includes a portion associated with first video data 604 and a portion associated with second video data 606, as generated in the example of FIG. 5. In the encoded video, a first subset of GOP files (i.e., GOP files 1.4, 1.5, and 2.5) are associated with the transition between the first video data 604 and the second video data 606. A command is received to adjust the transition as shown at 608 to generate a reencoded video. Using traditional methods, the entirety of the first video data 604 and the second video data 606 would need to be accessed to generate the reencoded video 608. In contrast, the use of GOP files in the depicted system eliminates the need for access and reencoding for several of the GOP files. A second subset of GOP files (i.e., GOP files 1.3, 1.4, 2.3, and 2.4) are associated with the transition of the reencoded video.

The system is configured to access GOP files associated with the first subset and the second subset (i.e., GOP files 1.3, 1.4, 1.5, 2.3, 2.4, and 2.5). The reencoded video 608 will change at the portions associated with these GOP files, but will not change at portions associated with GOP files outside of the first subset and the second subset (i.e., GOP files 1.2, 2.6, and 2.7). The system reencodes the encoded video 602 based on the accessed first and second subset GOP files without reaccessing the GOP files outside of the first subset and the second subset. Instead, the system reutilizes the encoded portions of those unchanged periods in the encoded video. In the example of FIG. 6, the system reuses portions of the encoded video associated with GOP files 1.2, 2.6, and 2.7 in the reencoded video without accessing the associated GOP files or reencoding video data associated with those portions. The system reencodes portions associated GOP files 1.3, 1.4, 2.3, 2.4, and 2.5 while removing portions associated with GOP file 1.5 (e.g., remove a portion of the encoded video 602 associated with the transition, remove a portion of the encoded video 602 associated with the changed transition, and using the encoded video, GOP files from the first subset, and GOP files from the second subset to reencode the encoded video).

This application uses examples to illustrate the invention. The patentable scope of the invention includes other examples.

It is claimed:

1. A computer-implemented method for encoding a video, the method comprising:
   receiving first encoded video data encoded from a first set of GOP units, wherein each GOP unit comprises exactly one unencoded independently coded frame and one or more unencoded dependently coded frames;
   receiving second encoded video data encoded from a second set of GOP units;
   receiving instructions for generating third encoded video data based on the first encoded video data and the second encoded video data, wherein the instructions identify a first transition frame from the first encoded video data and a second transition frame from the second encoded video data; and
   generating the third encoded video data by
      identifying a first transition GOP unit from the first set of GOP units, wherein the first transition GOP unit includes a first unencoded frame corresponding to the first transition frame;
      identifying a second transition GOP unit from the second set of GOP units, wherein the second transition GOP unit includes a second unencoded frame corresponding to the second transition frame;
      generating a third transition GOP unit based on the first transition GOP unit and the second transition GOP unit, wherein the third transition GOP unit includes a transition from the first unencoded frame to the second unencoded frame;
      encoding a transition encoded video data based on the third transition GOP unit and
      combining a subset of the first encoded video data, the transition encoded video data, and a subset of the second encoded video data to form the third encoded video data.

2. The method of claim 1 wherein the subset of the first encoded video data corresponds to video data encoded from the first set of GOP units that come before the first transition GOP unit.

3. The method of claim 1 wherein the subset of the second encoded via data corresponds to video data encoded from the second set of GOP units that come after the second transition GOP unit.

4. The method of claim 1 wherein the third transition GOP unit includes at least one frame from the first transition GOP unit and at least one frame from the second transition GOP unit.

5. The method of claim 1 wherein the subset of the first encoded video data and the subset of the second encoded video data are combined in the generated third encoded video data without re-encoding the corresponding GOP units.

6. The method of claim 1 wherein the subset of the first encoded video data and the subset of the second encoded video data correspond to GOP units that do not fall within the transition.

7. The method of claim 1 wherein the transition corresponds to a cross fade, a dissolve, a peel, a hard transition, or a wipe.

8. A non-transitory computer-readable medium containing instructions configured to cause one or more processors to perform a method for encoding a video, the method comprising:
receiving first encoded video data encoded from a first set of GOP units, wherein each GOP unit comprises exactly one unencoded independently coded frame and one or more unencoded dependently coded frames;
receiving second encoded video data encoded from a second set of GOP units;
receiving instructions for generating third encoded video data based on the first encoded video data and the second encoded video data, wherein the instructions identify a first transition frame from the first encoded video data and a second transition frame from the second encoded video data; and
generating the third encoded video data by
identifying a first transition GOP unit from the first set of GOP units, wherein the first transition GOP unit includes a first unencoded frame corresponding to the first transition frame;
identifying a second transition GOP unit from the second set of GOP units, wherein the second transition GOP unit includes a second unencoded frame corresponding to the second transition frame;
generating a third transition GOP unit based on the first transition GOP unit and the second transition GOP unit, wherein the third transition GOP unit includes a transition from the first unencoded frame to the second unencoded frame;
a transition encoded video data based on the third transition GOP unit and
combining a subset of the first encoded video data, the transition encoded video data, and a subset of the second encoded video data to form the third encoded video data.

9. The non-transitory computer-readable medium of claim 8 wherein the subset of the first encoded video data corresponds to video data encoded from the first set of GOP units that come before the first transition GOP unit.

10. The non-transitory computer-readable medium of claim 8 wherein the subset of the first encoded video data corresponds to video data encoded from a plurality of GOP units from the first set of GOP units.

11. The non-transitory computer-readable medium of claim 8 wherein the third transition GOP unit includes at least one frame from the first transition GOP unit and at least one frame from the second transition GOP unit.

12. The non-transitory computer-readable medium of claim 8 wherein the subset of the first encoded video data and the subset of the second encoded video data are combined in the generated third encoded video data without re-encoding the corresponding GOP units.

13. The non-transitory computer-readable medium of claim 8 wherein the subset of the first encoded video data and the subset of the second encoded video data correspond to GOP units that do not fall within the transition.

14. The non-transitory computer-readable medium of claim 8 wherein the transition corresponds to a cross fade, a dissolve, a peel, a hard transition, or a wipe.

15. A computer-implemented method for encoding a video, the method comprising:
receiving first encoded video data encoded from a set of GOP units, wherein each GOP unit comprises exactly one unencoded independently coded frame and one or more unencoded dependently coded frames;
receiving instructions for generating second encoded video data based on the first encoded video data, wherein the instructions identify a transition from a first time of the first encoded video data to a second time of the first encoded video data; and
generating the second encoded video data by
determining a first transition frame from the first encoded video data based on the first time;
determining a second transition frame from the first encoded video data based on the second time;
identifying a first transition GOP unit from the set of GOP units, wherein the first transition GOP unit includes a first unencoded frame corresponding to the first transition frame;
identifying a second transition GOP unit from the set of GOP units, wherein the second transition GOP unit includes a second unencoded frame corresponding to the second transition frame;
generating a third transition GOP unit based on the first transition GOP unit and the second transition GOP unit, wherein the third transition GOP unit includes a transition from the first unencoded frame to the second unencoded frame;
encoding a transition encoded video data based on the third transition GOP unit and
combining a first subset of the first encoded video data, the transition encoded video data, and a second subset of the first encoded video data to form the second encoded video data.

16. The method of claim 15 wherein the first subset of the first encoded video data corresponds to video data encoded from the set of GOP units that come before the first transition GOP unit.

17. The method of claim 15 wherein the first subset of the first encoded video data corresponds to video data encoded from one GOP unit.

18. The method of claim 15 wherein the first subset of the first encoded video data corresponds to video data encoded from a plurality of GOP units.

19. The method of claim 15 wherein the third transition GOP unit includes at least one frame from the first transition GOP unit and at least one frame from the second transition GOP unit.

20. The method of claim 15 wherein the first subset of the first encoded video data and the second subset of the first encoded video data are combined in the generated second encoded video data without re-encoding the corresponding GOP units.

21. The method of claim 15 wherein the first subset of the first encoded video data and the second subset of the first encoded video data correspond to GOP units that do not fall within the transition.

* * * * *